United States Patent [19]

Seitz

[11] 4,417,616
[45] Nov. 29, 1983

[54] HORIZONTAL PRESSURE DIE-CASTING MACHINE

[76] Inventor: Horst Seitz, Pestalozzistrasse 21, 3500 Kassel, Fed. Rep. of Germany

[21] Appl. No.: 292,490

[22] Filed: Aug. 13, 1981

[51] Int. Cl.³ .................. B22D 33/04; B22D 17/00
[52] U.S. Cl. .................................. 164/113; 164/137; 164/342; 164/343
[58] Field of Search .......................... 164/339–343, 164/113, 119, 120, 303, 306, 312, 314, 137; 425/589, 592, 450.1, 451.5, 451.9

[56] References Cited

U.S. PATENT DOCUMENTS

| 3,535,738 | 10/1970 | Vossen | 164/341 X |
| 4,061,182 | 12/1977 | Diez | 164/309 |
| 4,204,825 | 5/1980 | Furnas | 425/451.9 |

FOREIGN PATENT DOCUMENTS

| 52-22379 | 9/1974 | Japan | 164/339 |
| 522904 | 8/1976 | U.S.S.R. | 164/316 |
| 755421 | 8/1980 | U.S.S.R. | 164/342 |

Primary Examiner—Kuang Y. Lin

Attorney, Agent, or Firm—McGlew and Tuttle

[57] ABSTRACT

In a horizontal pressure die-casting machine having two fixing plates, each for one die the invention comprising a one of the fixing plate being pivotable into a horizontal position about a horizontal axis, and assembled of two parts, namely a base plate and a mounting plate. In the horizontal position, the die to be carried by the mounting plate and, provisionally, also the die to be carried by the stationary fixing plate can be exactly mounted and a cast produced can easily be removed. To take up the strong pressing forces occurring during a casting operation, the movable fixing plate which is pivoted back into its vertical position, is mechanically locked to the fixing plate, and the die to be carried by the latter is transferred thereto for final securing. The mounting plate is mounted on the base plate for being hydraulically displaced relative thereto by means of piston-and-cylinder units so that with the base plate locked in its vertical position, the mounting plate 6 can be moved toward the stationary fixing plate and the mold can be brought into its closed operating position.

18 Claims, 5 Drawing Figures

HORIZONTAL PRESSURE DIE-CASTING MACHINE

FIELD AND BACKGROUND OF THE INVENTION

The present invention relates in general to die-casting machines and, in particular to a new and useful horizontal pressure die-casting machine which utilizes a movable die part fixing plate, which is mounted for pivotal motion on a frame which also supports a stationary die part mounting plate.

In prior art horizontal pressure die-casting machines, in order to secure and remove the dies to and from two fixing plates, as well as to close or open the mold during operation, the movable fixing plate is displaced toward or away from the stationary fixing plate horizontally, in parallel position relative thereto. During the displacement, the movable fixing plate slides on rails of a base plate and is guided normally by four horizontal columns which extend between the stationary fixing plate and a fixed abutment. The two dies are displaced and closed by means of a hydraulically operated double toggle mechanism which is effective between the stationary fixing plate and the abutment. Depending on the specific conditions, very high closing forces may be applied through such a toggle mechanism.

SUMMARY OF THE INVENTION

The present invention is directed to a simplification and improvement of a machine of the above-mentioned kind and, particularly, to a construction of such a machine which is space saving.

Accordingly, an object of the invention is to provide a horizontal pressure die-casting machine which comprises, a frame, a stationary first fixing plate connected to the frame for supporting a first die part, a movable second fixing plate pivotally mounted to the frame for supporting a second die part, second plate drive means connected to the second fixing plate for moving the second fixing plate from a substantially horizontal position away from the first fixing plate, to a substantially vertical position facing and spaced from the first fixing plate. The second fixing plate, which is pivotally mounted to the frame, itself comprises a base plate which is directly pivoted to the frame, and a mounting plate part which is mounted for movement on the base plate. Mounting plate drive means are connected between the base plate and the mounting plate part for displacing the mounting plate part with respect to the base plate to move a second die part, mounted on the mounting plate part, toward the first die part on the stationary fixing plate, when the second fixing plate is in its substantially vertical position.

Another object of the invention is to provide such a machine which includes a locking mechanism for mechanically locking the stationary fixing plate with the movable fixing plate, when the movable fixing plate is in its substantially vertical position.

To secure or remove the dies, the movable fixing plate is no longer displaced horizontally in a position parallel to the stationary fixing plate, but is pivoted about a fixed horizontal axis into an at least substantially horizontal mounting position. The closing or opening of the mold is effected by correspondingly moving a mounting plate which is mounted on the pivotable plate for displacement. This design of the die-casting machine results in a substantial saving of space, since the overall length of the machine is considerably reduced due to the fact that the normal toggle, which requires much space, is no longer necessary. In addition, a part of the space otherwise needed for removing the product is gained by the possibility of pivoting the movable fixing plate.

A further considerable advantage is that the dies can be mounted and removed in a substantially simpler way, since the movable fixing plate is brought into its horizontal position just for this purpose. This facilitates the mounting of a die, not only on the movable fixing plate, but also on the stationary fixing plate. That is, the die to be secured to the stationary plate may first be fixed, by auxiliary screws or the like, to the movable plate which is brought into a horizontal position, and then, upon pivoting the movable plate toward the vertical stationary plate, finally secured to this plate.

Another object of the invention is to provide a horizontal pressure die-casting machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
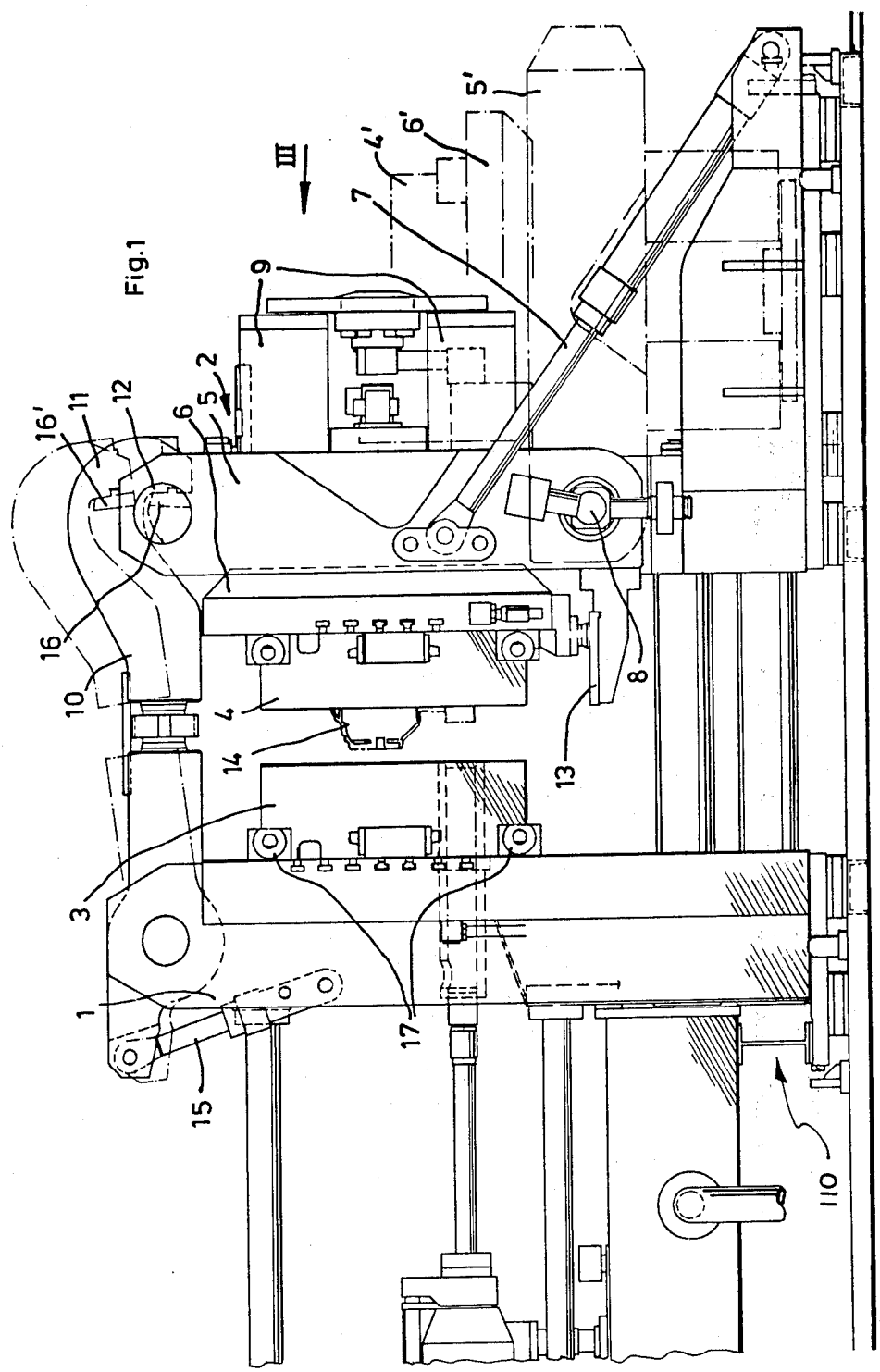
FIG. 1 is a general side elevational view of a horizontal pressure die-casting machine according to the invention.

According to the invention, a horizontal pressure die-casting machine for manufacturing light metal parts substantially comprises a vertically extending stationary, first fixing plate 1 to which a first die 3 is secured, and a movable, second fixing plate 2 to which a second die 4 is secured. The position shown is with the mold open, i.e, with the two dies 3 and 4 spaced apart. The finished part to be cast is indicated at 14. Upon pivoting fixing plate 2 into its horizontal position indicated in dash dotted lines, the molding part is detached from die 4 by means of hydraulically operated ejection pins (not shown).

The movable, second fixing plate 2 is made in two parts, including a basic plate 5 and a mounting plate 6 which is connected thereto and faces the stationary first fixing plate 1. Mounting plate 6 is mounted on base plate 5 for displacement, i.e. for being moved toward first fixing plate 1 for closing the mold, and away from first fixing plate 1 for opening the mold. This closing and opening is effected by means of hydraulic piston-and-cylinder units 9 having their cylinders secured to base plate 5 and their pistons secured to mounting plate 6.

Base plate 5 itself is not displaceable for translatory motion. However, it is mounted for pivoting about a fixed horizontal axis 8 which is embodied by journals supported on a base frame 110 or the like of the machine, so that the plate can be swung from its vertical position shown in FIG. 1 into an at least substantially horizontal mounting position which is indicated in dash dotted lines in FIG. 1, with the corresponding reference numerals indicating the base plate, the mounting plate, and the respective die, being provided with primes.

Fixing plate 2 is brought into its horizontal, mounting position particularly for securing the dies to the fixing plates or removing them therefrom, and for removing the manufactured part from the machine after every operating cycle. It is evident, that this greatly simplifies and facilitates the mounting and dismounting of the dies, both on mounting plate 6 and on the stationary, first fixing plate 1. That is, as an auxiliary measure, die 3 may first be fixed to the mounting plate 6 over die 4 with plate 6 in its horizontal position, whereupon, along with mounting plate 6 and base plate 5, die 3 can be moved into the vertical position to apply against stationary fixing plate 1, to which it is then secured in a proper position.

To take up the high pressures occurring during the pressure die-casting, pivotable base plate 5 in its vertical working position is mechanically locked to first fixing plate 1. For this purpose, pawl-shaped locking arms 10 are provided which are hinged to first fixing plate 1. In the vertical working position, the arms embrace associated abutments 12 of base plate 5. In the shown embodiment, the locking arms are hinged to the upper edge zone of fixing plate 1 and the abutments 12 are provided in the upper edge zone of base plate 5.

The free ends 11 of locking arms 10 are hook-shaped and provided with oblique contact faces 16 which snugly apply against the movably mounted abutments 12. To set the machine in operation, base plate 5 is initially pivoted, for locking, from its horizontal mounting position shown in dash-dotted lines toward the stationary, first fixing plate 1, into a slightly inclined position of engagement somewhat beyond its vertical working position, so that initially, only the oblique faces 16 of locking arms 10 lowered to base plate 5 oppose the movable abutment 12. Then, with the locking arms lowered to the base plate, the base plate is pivoted back from its somewhat inclined position of engagement into its vertical working position, so that the hook-shaped ends 11 of locking arms 10 securely embrace abutments 12 in a spatially defined manner, with the contact faces 16 being inclined relative to the vertical by about 10°, for example. The position occupied by the lifted locking arms 10 during the time the base plate is not in its vertical working position is indicated in dash-dotted lines.

The strong forces occurring during the casting operation proper, after closing the mold 3, 4 are thus securely taken up through locking arms 10.

In the present example, movable fixing plate 2 and locking arms 10 are pivoted, and mold 3,4 is opened or closed, hydraulically. Hydraulic piston-and-cylinder units 7 act upon pivotable base plate 5, hydraulic piston-and-cylinder units 15 move locking arms 10, and hydraulic piston-and-cylinder units 9 are supplied against mounting plate 6 to move it relative to base plate 5.

Figure 3:
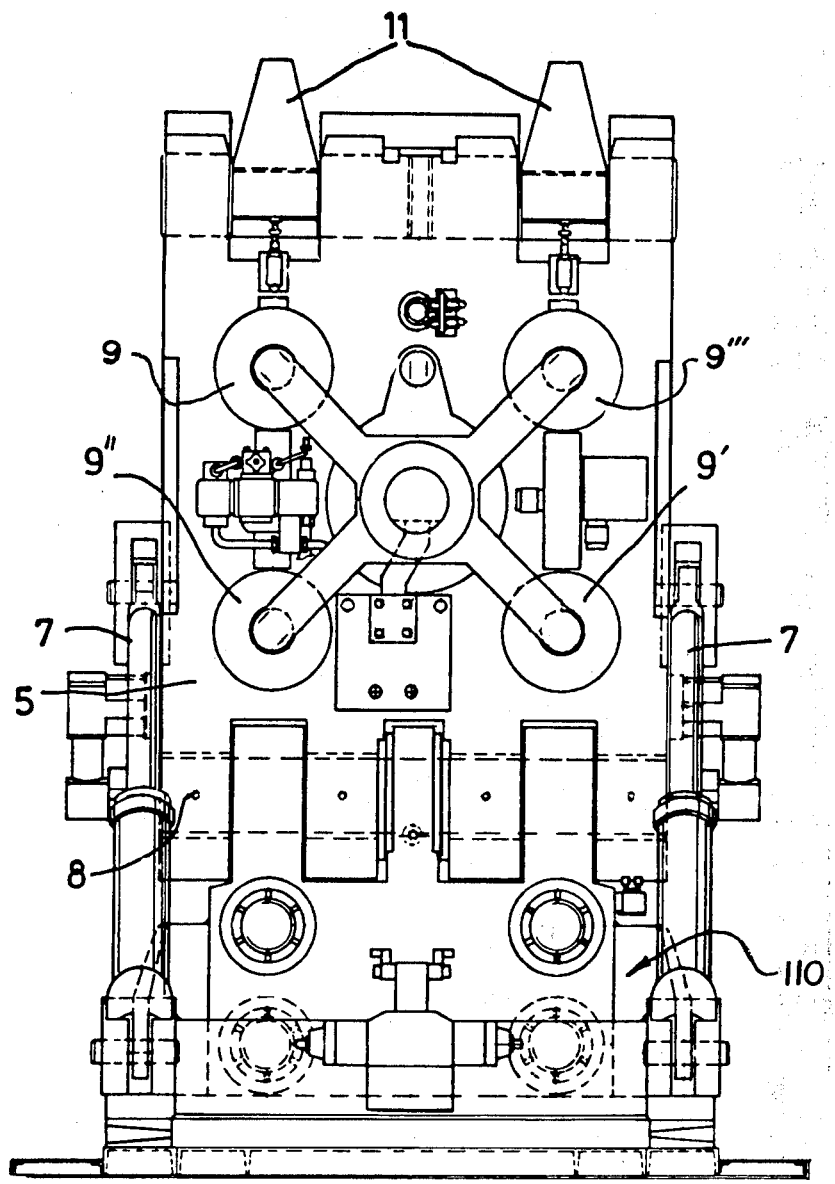
FIG. 3 is a front elevational view taken in the direction III indicated in FIG. 1.

In order to distribute the closing forces acting on movable mounting plate 6 as uniformly as possible over the mounting area, four piston-and-cylinder units 9 controlled in synchronism are provided in the present example, of which two and two are diametrally opposite, as shown in FIG. 3.

Displaceable mounting plate 6 is vertically resiliently supported on a horizontal bracket 13 of base plate 5. The guidance of displaceable mounting plate 6 is elastic, not rigid. This allows the two dies 3,4 to align with each other during the closing operation, in instances where deviations from parallelism occur. Consequently, the two dies 3, 4 apply against each other with ease and without stresses.

Figure 4:
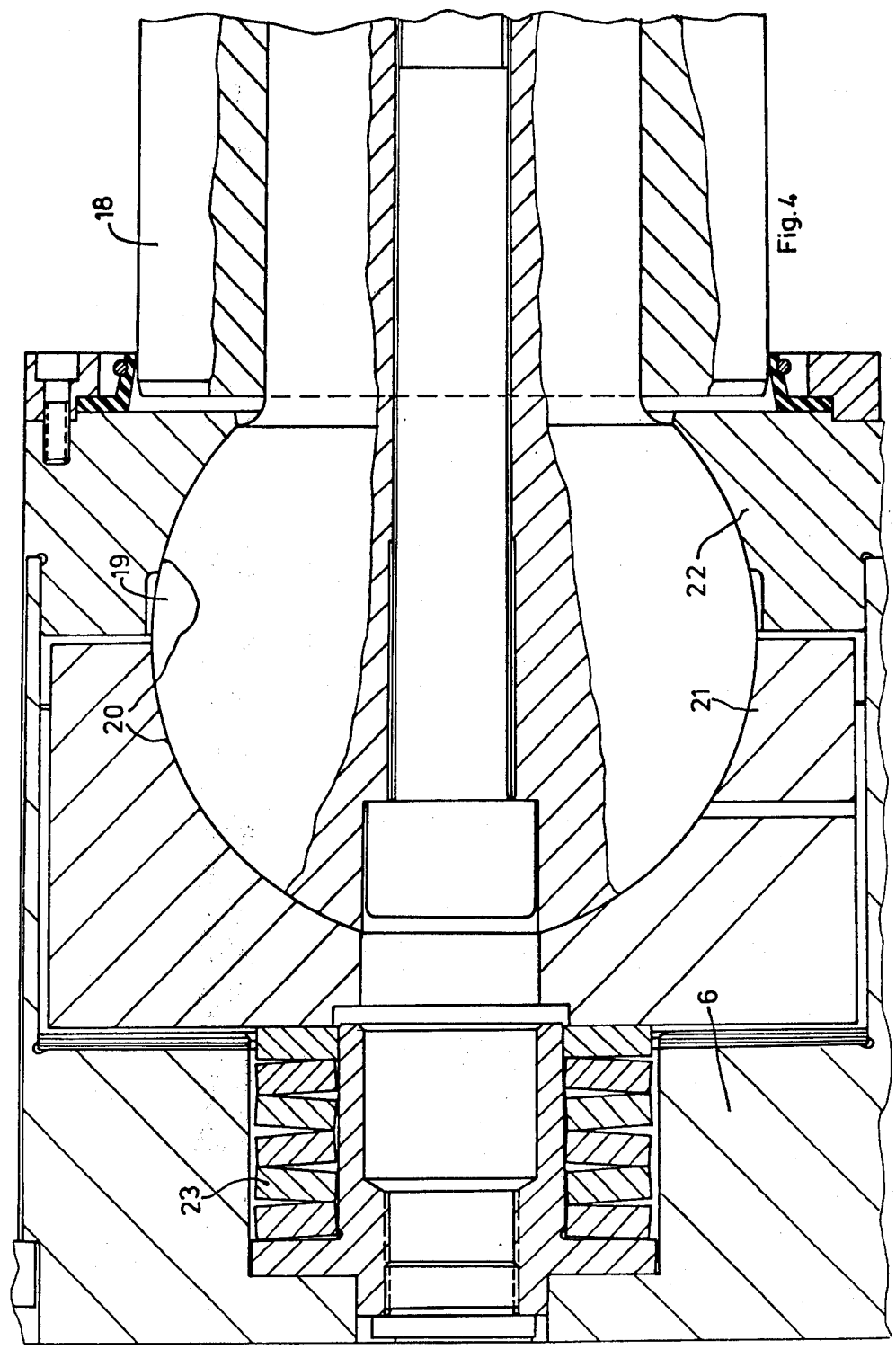
FIG. 4 is a detail showing the guidance and coupling of the mounting plate.

As shown in FIG. 4, the free ends of the piston rods 18 of hydraulic piston-and-cylinder units 9 acting on mounting plate 6 are designed as spherical heads 19 which are seated in ball sockets 20 within mounting plate 6. Ball sockets 20 parted along a vertical plane perpendicular to the longitudinal axis of the piston-and-cylinder unit, into two parts 21, 22 and apply against spherical heads 19 under the action of a spring assembly 23. Due to this design, mounting plate 6 can disengage during the closing operation from its guideway in the base plate, if necessary, in order to bring the two dies 3,4 into a stress-free contact with each other, even in the event of their initial disalignment. That is, during the closing operation, i.e., as hydraulic piston-and-cylinder units 9 act upon mounting plate 6 through their piston rods 18, spherical heads 19 may advance through a predetermined distance farther into mounting plate 6, against the action of spring assembly 23, in which case the respective spherical head continues to apply only against the left hand part 21 of the ball socket, and disengages a little from the right hand part 22 thereof. Left hand part 21 of the ball socket is thus slightly displaced farther to the left. This possibility of disengagement results in the substantial advantage that a certain lack of parallelism may be tolerated between the two fixing plates 1 and 2, without thereby affecting the tight contact between the dies in their closed position.

Figure 2:
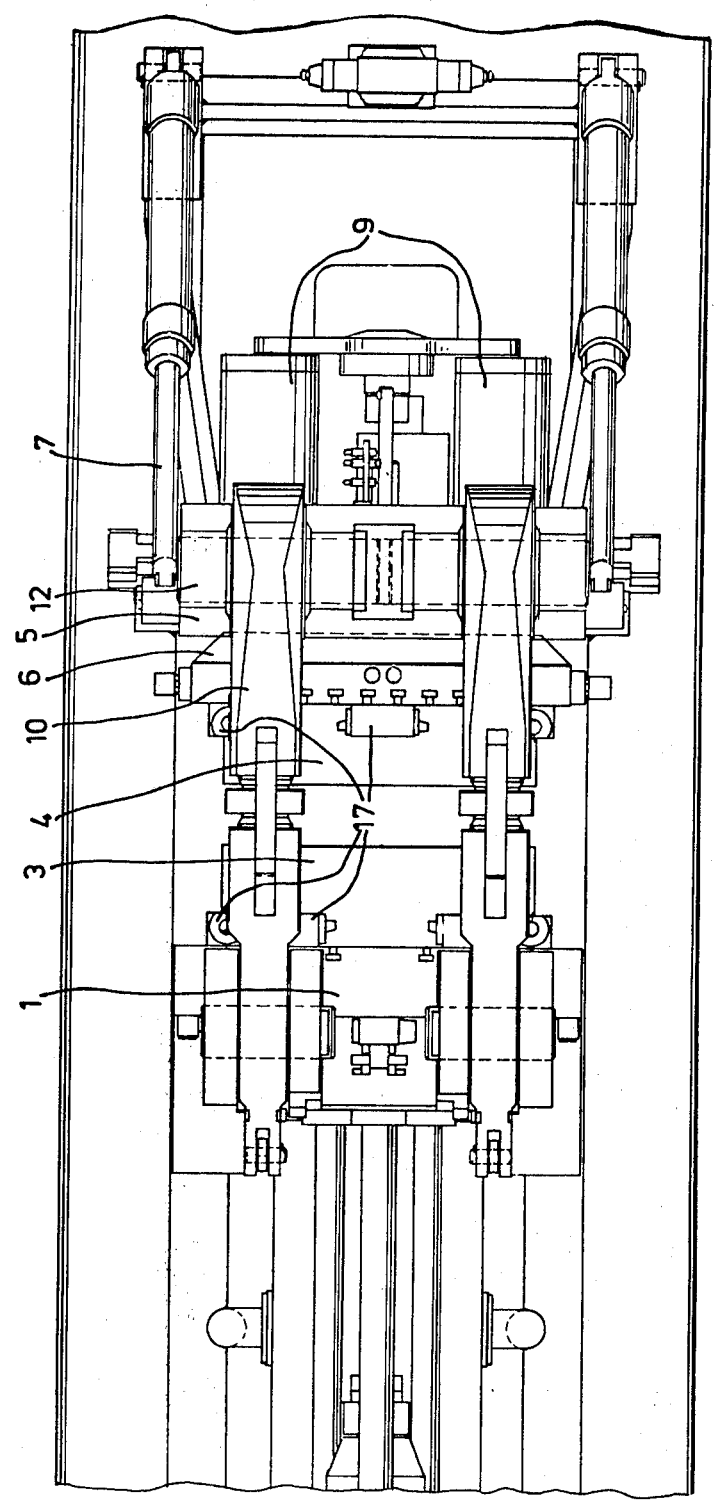
FIG. 2 is a top plan view of the device of FIG. 1.

In the present example, the two dies 3,4 are secured to the respective fixing plates 1, 2 by means of hydraulic clamping elements or die clampers 17. The clampers comprise hydraulic piston-and-cylinder units having conical or wedge-shaped piston extensions which extend parallel to the clamping plane and engage corresponding conical or wedge-shaped recesses of the respective die 3,4. The principle of this clamping is clearly shown in FIGS. 1 and 2. The conical or wedge-shaped members are so dimensioned and arranged that the dies are firmly pressed against fixing plates 1 or 2(6). The use of hydraulic die clampers results in very short mounting periods, because no mechanical, manual securing by means of clamping screws is needed. Some additional mechanical clamping members may be provided, of course, as a particular safety measure.

It is frequently necessary to supply compressed air, cooling water, and/or hydraulic fluid into the dies, either for special cooling, or for supplying core pullers, etc. Usually, the supply lines needed for this purpose outside the mold are installed subsequently, which may call for entire line nests partly even with the additional requirement of flexibility since they must follow the closing and opening motion of the fixing plates.

The inventive design eliminates the problem of external supply lines by providing that the two dies 3,4 are supplied with the necessary fluids through internal conduits, within the dies and the fixing plates. The conduits in fixing plate 1 or mounting plate 6 are designed for being joined to those of dies 3,4 by means of connections which are provided in the bottom of the dies and are coupled automatically to associated connections provided in the plates, as soon as the dies are clamped to fixing plate 1 or mounting plate 6. There is no need for an otherwise necessary subsequent installation of the piping, so that not only the mounting and dismounting periods are reduced, but also the reliability of operation is increased, since the internal conduits are less exposed to damage from the outside, for example.

The mold 3,4 is opened by hydraulic means only, i.e. without using any mechanical devices, such as toggle mechanisms, etc. The purely hydraulic closing of the mold is made possible due to the provision that mounting plate 6 executes relatively short closing motions, after a distance usually covered in conventional pressure die-casting machines has already been covered by the pivotal motion of base plate 5. Should a purely hydraulic closing of the mold be wanted in conventional pressure die-casting machines, it would be necessary to employ very long hydraulic cylinders, which is restrictive in practice, because of the compressibility of the hydraulic fluid.

Advantageously, a tandem arrangement may be provided for hydraulic piston-and-cylinder units 9 acting as closing cylinders. In such an arrangement, each unit is designed with two pistons, each in a separate cylinder chamber, which operate on a common piston rod, as diagrammatically shown in FIG. 5, with four piston-and-cylinder units designated 9 to 9''' being provided in accordance with FIG. 3. Cylinder units 9, 9'', and 9'', 9''', respectively are at diagonally opposite locations. The cylinder chambers which are separated from each other, are designated 93 and 94, and the pistons operating therein are 91 and 92. In this regard the four cylinder-piston units are the same.

Figure 5:
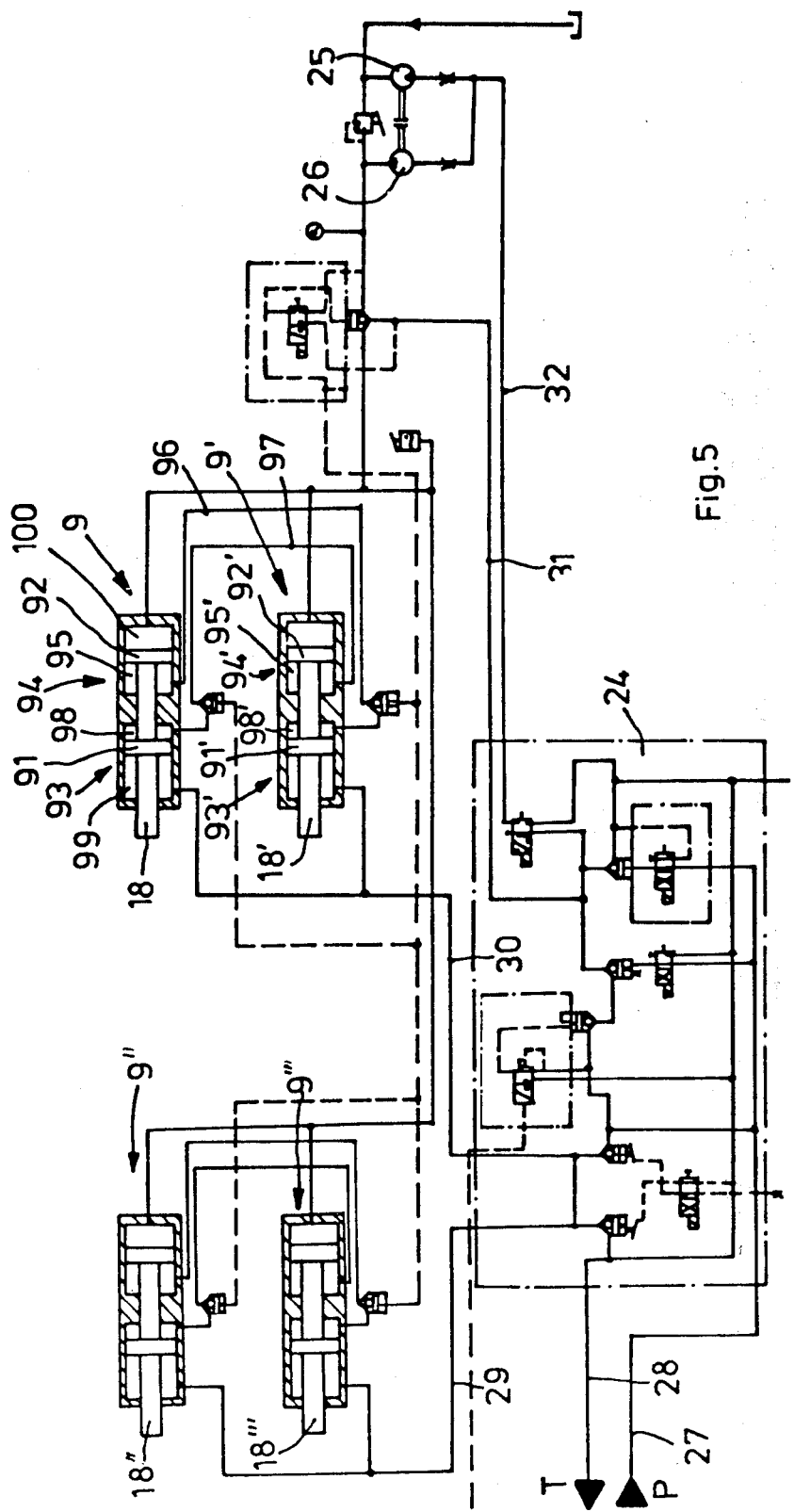
FIG. 5 is a schematic diagram of the hydraulic piston-and-cylinder units for displacing the mounting plate.

To obtain a synchronous operation of hydraulic piston-and-cylinder units 9, the diametrally opposite units are coupled to each other by pressure lines in a manner such that the cylinder space of one of the cylinder chambers of one unit, diminishing due to the displacement of pistons 91, 92 or 91', 92', is connected to a cylinder space simultaneously enlarging of one of the cylinder chambers of the other unit, and vice versa. In the present example, as shown in FIG. 5, cylinder space 95 of piston-and-cylinder unit 9 is connected through a line 96 to cylinder space 98' of second piston-and-cylinder unit 9', and cylinder space 98 of first unit 9 is connected through a line 97 to cylinder space 95' of second unit 9'. During a forward displacement of the pistons, i.e., as mounting plate 6 is moved toward stationary fixing plate 1, hydraulic fluid is forced from cylinder space 95 through line 96 into cylinder space 98' of second cylinder unit 9' and, inversely, from cylinder space 95' through line 97 into cylinder space 98. During the reversed motion of the pistons, such as when the mold is being opened, hydraulic fluid flows from cylinder space 98 into cylinder space 95' and from cylinder space 98' into cylinder space 95. The cylinder-and-piston diameters of all the four cylinder chambers are identical. Consequently, only as much of hydraulic fluid can flow out from one cylinder space as can be received in the corresponding cylinder space of the other unit. This necessarily causes the desired simultaneous operation of the diagonally paired piston-and-cylinder units.

The hydraulic fluid needed for moving mounting plate 6 back and forth, i.e., for the forward and rearward action of piston-and-cylinder units 9 is supplied to the units by a pressure source, such as a pump P (not shown in detail), through a line 27 and an only diagramatically indicated control circuit 24, and through either lines 29 or 30 to cylinder space 99, etc., or line 31 to cylinder spaces 100, etc. The fluid returns through a line 28.

While a hydraulic pressure of 150 bar, for example, is sufficient for the development proper of the mounting plate 6, a substantially higher pressure of 350 bar, for example, is needed for the closing operation. Advantageously, this higher pressure is produced by means of a hydraulic motor 25 driving a hydraulic pump 26 and is supplied to units 9 or 9''' at the required instant. For this purpose, the oil flow is switched by control circuit 24 from line 31 to line 32. Then, hydraulic motor 25 and hydraulic pump 26 are connected to the supply line 27. This solution is substantially more advantageous for producing the higher hydraulic pressure than the use of a hydraulic pump which would be driven by a separate electric motor, for example. Aside from the mentioned elements, a plurality of other control or protective devices is provided as usual within the hydraulic circuitry, such as check valves, safety valves, etc., which however, are not essential to the invention and therefore neither described nor provided with reference numerals.

The invention disclosed is thus a horizontal pressure die-casting machine which comprises a frame 110, a stationary first fixing plate 1 connected to the frame 110 for supporting a first die part 3, a movable second fixing plate 2 pivotally mounted to the frame 110 for supporting a second die part 4, second plate drive means 7 connected to the second fixing plate 2 for moving the second fixing plate of a substantially horizontal position away from the first fixing plate 1, to a substantially vertical position facing and spaced from the first fixing plate 1, the second fixing plate comprising a base plate part 5 pivotally mounted to the frame 110 and a mounting plate part 6 for supporting the second die part 4, mounted for movement on the base plate part 5, and mounting plate drive means 9 connected to the base plate part 5 and mounting plate part 6 for displacing the mounting plate part with respect to the base plate part to move the second die part 4 toward the first die part 3 with the second fixing plate 2 in its substantially vertical position.

While a specific embodiment of the invention has been shown and described in detail to illustrate the application of the principles of the invention, it will be understood that the invention may be embodied otherwise without departing from such principles.

What is claimed is:

1. A horizontal pressure die-casting machine comprising:
   a frame;
   a first and second die part;
   a substantially vertically extending stationary first fixing plate connected to said frame for supporting said first die part;
   a movable fixing plate pivotally mounted to said frame for supporting said second die part;
   second plate drive means connected to said second fixing plate for moving said second fixing plate from a substantially horizontal mounting position away from said first fixing plate, to a substantially vertical working position facing and spaced from said first fixing plate;
   said second fixing plate comprising a base plate part pivotally mounted to said frame, a mounting plate part for supporting said second die part movably mounted on said base plate part, and mounting plate drive means connected to said base plate and mounting plate parts for displacing said mounting plate part with respect to said base plate part to move said second die part toward said first die part with said second fixing plate in its substantially vertical position.

2. A horizontal pressure die-casting machine according to claim 1, including locking means connected between said stationary first fixing plate and said movable second fixing plate, with said movable second fixing plate in its substantially vertical position for mechanically locking said second fixing plate to said first fixing plate.

3. A horizontal pressure die-casting machine according to claim 2, wherein said locking means comprises at least one pawl shaped locking arm hinged to said stationary first fixing plate, at least one abutment member connected to said base plate part of said movable second fixing plate for engagement by said locking arm with said second fixing plate in its substantially vertical position, said at least one abutment member positioned near an upper area of said base plate part.

4. A horizontal pressure die-casting machine according to claim 3, wherein said pawl shaped locking arm includes a hook shaped end having an oblique contact surface extending to a base of the hook shaped end, said base plate part pivotally mounted to said frame and said second plate drive means being effective to move said second fixing plate beyond its substantially vertically position toward said stationary first fixing plate so that said hook shaped end and oblique contact surface of said locking arm can move over said abutment member of said base plate part, said second plate drive means being operable, after said hook shaped end and said oblique contact surface are engaged over said abutment member to return said second fixing plate to its substantially vertical position.

5. A horizontal pressure die-casting machine according to claim 1, wherein said mounting plate drive means comprises a plurality of hydraulic piston/cylinder units connected between said base plate part and said mounting plate part.

6. A horizontal pressure die-casting machine according to claim 5, including at least two pairs of diametrically opposed piston/cylinder units connected between said base plate and mounting plate parts.

7. A horizontal pressure die-casting machine according to claim 6, including four piston/cylinder units positioned in diametrically opposed pairs between said base plate and mounting plate parts.

8. A horizontal pressure die-casting machine according to claim 5, including yielding connection means connected between each of said piston/cylinder units and said mounting plate part for establishing parallelism between said first and second die parts when said piston/cylinder units are operable to move said second fixing plate toward said first fixing plate in the substantially vertical position of said second fixing plate.

9. A horizontal pressure die-casting machine according to claim 8, wherein said piston/cylinder units each have a cylinder connected to said base plate part and a piston with piston rod extending toward said mounting plate part, said yielding connection means comprising a spherical head at the end of each piston rod extending toward said mounting plate part, means on said mounting plate part defining a ball socket for receiving said spherical head, said means defining said ball socket comprising two parts parted along a plane extending perpendicular to a longitudinal axis of the piston/cylinder unit carrying said piston rod, and a biasing spring biasing one of said ball socket parts against said spherical head, so that when said spherical head is under force exerted by said piston/cylinder unit, a biasing force of said biasing spring can be overcome to maintain parallelism between said first and second die parts by an additional movement of said spherical head beyond a position of said mounting plate through a compression of said biasing spring.

10. A horizontal pressure die-casting machine according to claim 6, wherein each of said piston/cylinder units comprises tandem pistons connected to a common piston rod with a separate cylinder chamber for each of said tandem pistons, each tandem piston of each piston/cylinder unit dividing each separate cylinder chamber into two cylinder spaces, and pressure lines connecting a cylinder space of one piston/cylinder unit which diminishes in volume to a cylinder space of a diametrically opposed piston/cylinder unit which increases in volume during the operation of said piston/cylinder units.

11. A horizontal pressure die-casting machine according to claim 1, wherein said second plate drive means comprises at least one piston/cylinder unit.

12. A horizontal pressure die-casting machine according to claim 3, including a piston/cylinder unit connected to said at least one locking arm for moving said at least one locking arm to engage and disengage said abutment member of said base plate part.

13. A horizontal pressure die-casting machine according to claim 1, including hydraulically or pneumatically operable die clamping means connecting said first and second die parts to said stationary first fixing plate and said mounting plate part respectively.

14. A horizontal pressure die-casting machine comprising:
   a frame;
   a first and a second die part;
   a stationary first fixing plate connected to said frame for supporting said first die part;
   a movable second fixing plate connected to said frame for supporting said second die part;
   second plate drive means connected to said second fixing plate for moving said second fixing plate from a substantially horizontal position away from said first fixing plate, to a substantially vertical working position facing and spaced from said first fixing plate;
   said second fixing plate comprising a base plate part pivotally mounted to said frame, a mounting plate part for supporting said second die part movably mounted on said base plate part, and mounting plate drive means connected to said base plate and mounting plate parts for displacing said mounting plate part with respect to said base plate part to move said second die part toward said first die part with said second fixing plate in its substantially vertical working position;
   said mounting plate drive means comprising a plurality of hydraulic piston/cylinder units connected between said base plate part and said mounting plate part; and
   yielding connection means connected between each of said piston/cylinder units and said mounting plate part for establishing parallelism between said first and second die parts when said piston/cylinder units are operable to move said second fixing plate toward said first fixing plate in the substantially vertical position of said second fixing plate.

15. A method of operating a horizontal pressure diecasting machine which includes a frame, a vertical stationary first fixing plate connected to the frame for supporting a first die part, a movable second fixing plate pivotally mounted to the frame for supporting a second die part, and second plate drive means connected to the second fixing plate for moving the second fixing plate, with the movable second fixing plate itself including a base plate pivotally mounted to the frame and a mounting plate movably mounted to the base plate and movable by mounting plate drive means, the method comprising:

activating said first plate drive means for moving said first fixing plate from a substantially horizontal mounting position into a substantially vertical working position facing and spaced from said first fixing plate to align the first and second die parts; and activating said mounting plate drive means to move the second die part toward and into engagement with the first die part.

16. A method according to claim 15, wherein said horizontal pressure die casting machine includes a pawl shaped locking arm pivotally mounted to said stationary fixing plate and an abutment member connected to said base plate engageable by said pawl shaped locking arm, the method including activating said second plate drive means to move said second fixing plate beyond its substantially vertical position toward said stationary first fixing plate, moving said pawl shaped locking arm down over said abutment member, and activating said second plate drive means in an opposite direction to return said second fixing plate into its substantially vertical position and to engage and lock said pawl shaped locking arm onto said abutment member.

17. A method according to claim 15, including connecting the second die part to said movable second fixing plate when said movable second fixing plate is in its substantially horizontal position.

18. A method according to claim 17, including temporarily engaging the first die part over a second die part which is connected to said second fixing plate, activating said second plate drive means to move said second fixing plate into its substantially vertical position with the first and second die parts engaged thereby, and connecting the first die part to said stationary first fixing plate after said second fixing plate is in its substantially vertical position.

* * * * *